United States Patent
Kurtz et al.

(10) Patent No.: US 8,721,830 B2
(45) Date of Patent: May 13, 2014

(54) METHOD FOR FINISHED-RIB COMPACTING A THERMOPLASTIC COMPOSITE PART WITH CONTINUOUS FIBERS

(75) Inventors: Didier Kurtz, Pornic (FR); Florian Chotard, Nantes (FR)

(73) Assignee: Airbus Operations S.A.S., Toulouse (FR)

( * ) Notice: Subject to any disclaimer, the term of this patent is extended or adjusted under 35 U.S.C. 154(b) by 128 days.

(21) Appl. No.: 13/203,350

(22) PCT Filed: Feb. 24, 2010

(86) PCT No.: PCT/FR2010/050317
§ 371 (c)(1),
(2), (4) Date: Dec. 6, 2011

(87) PCT Pub. No.: WO2010/097547
PCT Pub. Date: Sep. 2, 2010

(65) Prior Publication Data
US 2012/0067509 A1    Mar. 22, 2012

(30) Foreign Application Priority Data
Feb. 27, 2009 (FR) .................................. 09 51244

(51) Int. Cl.
*B32B 37/00* (2006.01)
*B32B 38/04* (2006.01)

(52) U.S. Cl.
USPC ........... 156/264; 156/222; 156/256; 156/290; 156/311; 156/312; 156/443; 156/449; 264/152; 264/160; 264/248; 264/258; 264/339

(58) Field of Classification Search
USPC ......... 156/222, 256, 290, 311, 312, 443, 449, 156/264; 264/152, 160, 258, 248, 339
See application file for complete search history.

(56) References Cited

U.S. PATENT DOCUMENTS

| 6,613,258 B1 | 9/2003 | Maison et al. |
| 2003/0175520 A1 | 9/2003 | Grutta et al. |

(Continued)

FOREIGN PATENT DOCUMENTS

| FR | 2 766 407 | 1/1999 |
| FR | 2 905 891 | 3/2008 |
| WO | 03 078164 | 9/2003 |

OTHER PUBLICATIONS

Campbell, F. C., "Manufacturing Processes for Advanced Composites" Thermoplastic Composites: An Unfulfilled Promise, pp. 369-372, XP-002547705, (2004).

(Continued)

*Primary Examiner* — Linda L Gray
(74) *Attorney, Agent, or Firm* — Oblon, Spivak, McClelland, Maier & Neustadt, L.L.P.

(57) ABSTRACT

A method for manufacturing a structural part including at least two wings extending in intersecting planes made of thermoplastic fiber-reinforced composite material including at least two plies of continuous fibers. The fibers extend from one wing to another. The method includes cutting the at least two plies in a fabric and/or a tape of fibers pre-impregnated with a thermoplastic resin; assembling the plies to create a preform; and compacting the preform to a final shape of the part by subjecting the preform to a defined cycle of temperature and pressure. A toolset can implement the method described above. Such a toolset includes a rigid punch and die such that closing the tool creates a sealed chamber in a shape of the part between the punch and the die.

8 Claims, 7 Drawing Sheets

(56) References Cited

U.S. PATENT DOCUMENTS

2006/0125156 A1* 6/2006 Woolhouse .................. 264/571
2007/0023975 A1* 2/2007 Buckley ....................... 264/494
2009/0321978 A1 12/2009 Kurtz et al.
2011/0017386 A1 1/2011 Bouvet et al.

OTHER PUBLICATIONS

International Search Report Issued Sep. 13, 2010 in PCT/FR10/050317 filed Feb. 24, 2010.

* cited by examiner

1A

1B

METHOD FOR FINISHED-RIB COMPACTING A THERMOPLASTIC COMPOSITE PART WITH CONTINUOUS FIBERS

The invention belongs to the field of methods for manufacturing load-bearing composite parts made of thermoplastic matrix reinforced with continuous fibers. More specifically, the invention relates to a method for obtaining finished parts, i.e. not requiring additional machining operations, in a single compaction-consolidation operation.

Composite materials comprising a matrix consisting of a plastic material reinforced by fibers make mechanical parts possible that are characterized by a very advantageous weight-strength ratio. This type of part is advantageous in any application where such a weight-strength ratio is essential. For example, in applications relating to vehicles, to enable reduced energy consumption, and more specifically in the field of aeronautics. In these fields, such materials reinforced with continuous fibers advantageously replace metal materials, light alloys in particular.

However, the implementation and processing of these composite materials reinforced with continuous fibers is still expensive in comparison to the implementation methods used for metals.

Indeed metallic materials allow structural parts to be manufactured by the plastic forming of sheet or extruded metal. Such methods make very high production rates possible and typically allow parts to be realized that are finished to specifications straight from the press, i.e. that require no machining rework after forming. In comparison, manufacturing parts made of continuous fiber-reinforced composites uses techniques of layering and ply-by-ply laying up of either dry fiber or pre-impregnated fibers.

When it comes to dry fiber, the preform is made on a template in the shape of the final part. Said preform, which has little cohesion and is therefore difficult to handle, is placed in a mold and impregnated with resin by known techniques, such as pressurized liquid resin transfer or resin infusion. These methods are long, require expensive tools and are difficult to automate. They do not allow high production rates to be achieved, unless the number of tools is increased.

Alternatively, the layup can be realized in shape from fibers pre-impregnated with thermosetting resin. Such resins have sufficient tack at ambient temperature to stabilize the deposited plies and the preform. The layup may be performed by automated means. The resulting preform is then cooked under pressure in a suitable mold to obtain the final part. While this method allows a greater degree of automation, it also does not allow production rates comparable to those of metal parts to be achieved. In addition, the usability of thermosetting resin pre-pregs is limited due to the slow polymerization of the resin including at ambient temperature.

Composites based on thermoplastic resin permit methods close to those used for metals, because the resin's fusion-solidification reaction is reversible. In this way, discontinuous fiber-reinforced composite sheets can be pre-made, then stamped in the manner of sheet metal using a punch/die or punch/bladder method of heating said sheets above a "softening" temperature of the resin, which temperature ranges between the resin's glass transition and fusion temperatures, depending on the type of said resin.

This type of method can get close to the production rates of metal parts. However, it is not directly applicable to continuous fiber-reinforced composites. Indeed, such reinforcements, such as glass, carbon or aramid fibers, have no plastic deformation property. Consequently, stamping a sheet, or blank, made of a continuous fiber-reinforced composite is possible only by allowing interlaminar slippage of the plies making up the sheet.

This type of method is known in the prior state of the art and is described in patent EP1543942 in the name of the applicant, for example. FIG. 1 is a summary of this method. The blanks are pre-cut, generally as a set, in a precompacted sheet, in the desired stacking sequence. FIG. 1A, the blank (10) pre-compacted and made of plies (11, 12, 13) is heated to a temperature near the fusion temperature. Applying the punch (2), FIG. 1B, allows the part to be formed by causing interlaminar slippage of the plies. This slippage is made possible by the fluidity of the resin at this temperature. The challenge is to bring about this slippage without causing the wringing out of the resin between the fibers in particular at the top of the punch (2). To this end, the imprint is balanced, i.e. the orientation of the part in the forming operation is chosen so that the movement of the punch is translated into a relatively uniform pressure on the walls of the part without blocking the edges. The part is then kept under pressure to a clearance value (e), monitored until it has cooled, when it can be removed from the mold. Because of the interlaminar slippage, the edges of the part must be finished subsequently. Indeed, the slippage is visible on the edges, which are generally not compacted and have insufficient resin.

The part must therefore be trimmed, which is difficult because the non-compacted edges are very susceptible to delamination, which delamination can spread inside the part when subjected to a cutting tool. It is therefore not possible, according to this method, to obtain parts finished to specification straight from the press. In addition, this method requires stocking pre-compacted sheets matching the desired stratification of the part; these pre-compacted sheets can no longer be used if the stacking sequences of the part are altered, for example as a result of optimization, or for another part having a different stacking sequence. These sheets cause loss of profits and make it difficult to optimize the use of the material.

In comparison, the methods using the form layup techniques make it possible to keep the material in the form of tapes or fabric, which are assembled at the last minute to make up the preform. Used for manufacturing thermoplastic parts, the methods of consolidation/compaction of a stack of plies impregnated with thermoplastic resin typically use devices using bladders associated or not with compaction plates, in order to compensate for the significant expansion of the resin during the consolidation cycle, so that these methods are dedicated to the production of relatively flat parts or parts having only shallow stamp depths, i.e. stamp depths of the order of one tenth of the largest dimension of the part or less. An example of such a method is described in international application WO2008/031866 in the name of the applicant.

There is therefore a need for a method for fast forming to finished specifications, i.e. producing parts with clean edges and manufactured with such precision that subsequent trimming is not necessary, which is applicable to structural parts with a deep stamp, consisting of several plies of continuous fiber reinforced material, which avoids the need to store laminated sheets dedicated to this type of part. A deep stamp corresponds to a stamped depth of the same order of magnitude as the largest dimension of the part.

To meet this need, the invention provides a method for manufacturing a structural part comprising at least two wings extending in intersecting planes made of thermoplastic fiber-reinforced composite material comprising at least two plies of continuous fibers; said fibers extend from one wing to another; the method comprises:

A cutting step which consists of cutting the at least two plies in a fabric and/or a tape of fibers pre-impregnated with thermoplastic resin;

A layup step which consists of assembling the plies so as to create a preform;

A consolidation step which consists of compacting said preform to the final shape of the part by subjecting it to a defined cycle of temperature and pressure;

such that the cutting step comprises cutting each ply to a contour determined by the orientation of the fibers and the position of the ply within the depth of the part. Using thermoplastic resin provides an answer to the problem of storing the pre-impregnated tapes or fabrics; such a resin has no use limit date and avoids storing pre-compacted sheets whose use is dedicated to one type of part.

Cutting to a precise contour depending on the position in the depth of the ply allows clean edges to be obtained at the end of compaction into shape and a finished contour part to be obtained without further machining.

Advantageously, the consolidation step is carried out in a toolset comprising a rigid punch and die. Thus it is possible to obtain a calibrated part thickness at all points and a perfect surface finish on both surfaces; these characteristics are difficult or even impossible to obtain using the bladder devices of the prior state of the art, due to the flexibility of said bladder.

In order to stabilize the preform, the layup step comprises assembling the plies by welding. Such a weld is realized by heating the pre-preg stack locally and for a short time. The resin fluidized by heating flows between the plies and then holds them firmly assembled on cooling. Such a weld can be realized by points or along weld lines, by means such as a soldering iron in the case of a manual layup, or by other higher energy means such as laser or ultrasonic end effectors, also known as "sonotrode", in the case of an automatic layup.

Advantageously, such a weld is realized by successive points or following a weld line along a forming generatrix. The forming generatrices correspond to the fold lines of the flat preform to obtain the part. There is no interlaminar travel of the plies along these generatrices during folding. Said generatrices are defined by balancing the part in the toolset. The position of the forming lines on each ply also defines the perimeter of said ply according to its position in the stack. Pre-assembling the plies along the forming generatrices means firstly that the preform can be placed more accurately in the toolset and secondly that any movement of the preform while closing the mold is avoided.

The preform consolidation stage is realized according to a pressure/temperature cycle comprising:

a temperature rise under a first pressure P1, applied to the preform up to a temperature equal to or greater than the resin's fusion temperature;

followed by remaining at this temperature under a pressure P2, which is higher than P1;

followed by cooling to a temperature T2, lower than the resin's glass transition temperature under pressure P2;

followed by pressure release.

The first pressurization, optionally combined with vacuum-filling the imprint, helps degas the preform; the second pressurization is applied when the resin is already fluidized and ensures compaction. Maintaining the pressure throughout the cooling phase helps limit distortions of the preform during this phase.

The invention also concerns tools for implementing the method described above. Such a toolset comprises a rigid punch and die such that closing the tool creates a sealed chamber in the shape of the part between the punch and the die. Advantageously, said toolset comprises means to seal the chamber between two relative positions of the punch and the matrix, corresponding to two defined clearance values (e1, e2). This hermetic chamber allows the imprint to be vacuum-filled to help promote the degassing of the preform during the fusion of the resin and prevent loss of any resin, spilling outside the imprint, during the various phases of preform consolidation.

According to an advantageous embodiment of the tools:

the stamp comprises a ridge protruding from the shape of the part, the die comprises a ridge hollow in relation to the shape of the part;

the ridge of the punch is designed to fit into the ridge of the die when closing the toolset;

a deformable seal is located between the ridges of the punch and of the die.

Thus the volume of the toolset and the outline of the part are perfectly defined and fixed as soon as the tool is closed. The deformable seal keeps the chamber hermetically sealed regardless of the clearance.

To ensure optimum degassing, the toolset according to the invention comprises means designed to suck the gases contained in said hermetic chamber in order to create a primary vacuum.

To ensure the material soundness of parts realized using the method according to the invention, the toolset comprises means capable of applying to the preform placed in the hermetic chamber, a pressure substantially equal to P1 for the first clearance value (e1) and a pressure substantially equal to P2 for a second clearance value (e2) such that the first clearance value (e1) is greater than the second (e2). The clearance values are chosen such that e2 corresponds to the final theoretical value of the thickness of the part and the clearance value e1 to the same thickness increased by the expansion of the preform. This configuration avoids the risks of lack of resin or of interlaminar drying of said resin.

Advantageously, the toolset according to the invention comprises drilling means to drill the preform during consolidation.

Integrating these drilling means allows making use of the resin's fluidity and realizing holes in the part without cutting its fibers.

Combining these various features allows the manufacture of thermoplastic composite parts reinforced with continuous fibers at high production rates. Such parts may contain up to 70% reinforcing fibers whose quality, both in terms of their geometry and of their material soundness, is compatible with the most demanding aerospace applications.

FIG. 1, already mentioned, is a summary, cross-section view of the stamping of a pre-compacted thermoplastic composite blank consisting of 3 plies of continuous fibers according to the prior state of the art. FIG. 1A before stamping, and FIG. 1B when the forming punch is applied.

FIG. 10A for the die portion, FIG. 10B for the punch portion.

FIG. 11A prior to fusion of the die, FIG. 11B after fusion of the die and up to cooling down part, before it is released.

Figure 1:
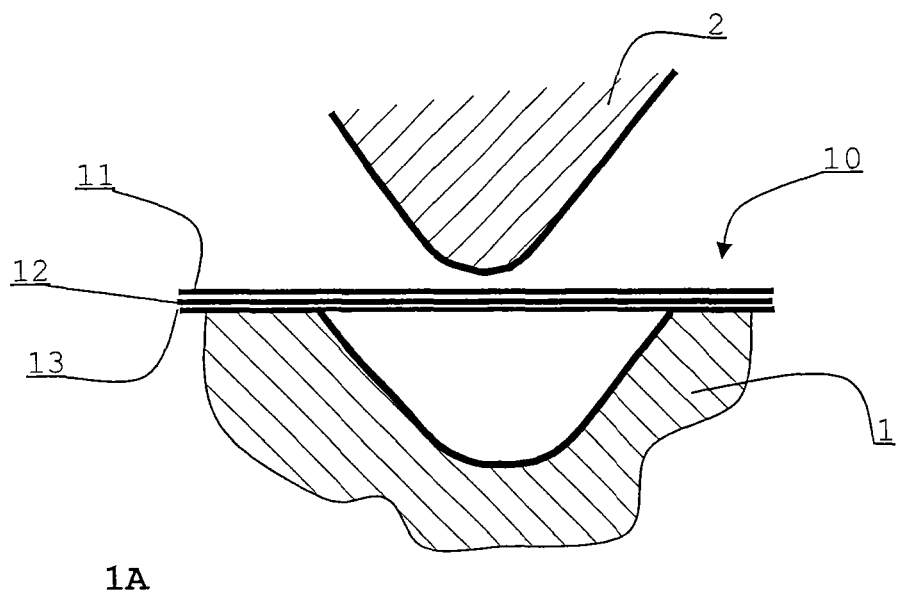
Figure 1:
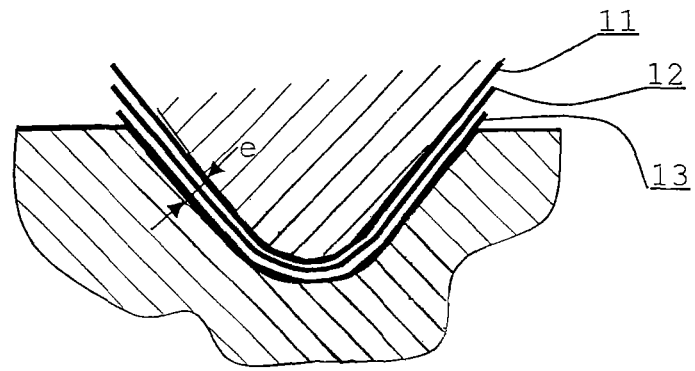

The stamping method of continuous fiber thermoplastic composites according to the previous state of the art, FIG. 1, uses pre-compacted blanks, i.e. sheets of material (10) made up of plies (11, 12, 13) in the form of continuous fiber tapes or fabrics previously consolidated.

This initial consolidation is realized, for example, by a method such as described in the patent application WO2008/031866. The stamping method of the previous state of the art uses a punch (2) and die (1), the blank being formed in the clearance between the punch and the die.

To be formed, the blank must be heated to a temperature sufficient to soften the resin enough to make interlaminar slippage possible by flow of said resin between the plies.

This temperature is near or above the resin's fusion temperature. When heated to this temperature, the blank loses its cohesion and applying the punch (2) can trigger the relative sliding of the plies, so that they do not undergo deformation and retain their original length. Forming is performed with a constant quantity of resin, i.e. the amount of resin initially present in the consolidated blank, such that the end zones of the blank, in addition to showing the interlaminar slippage, have no resin present and have very little cohesion.

These low cohesion areas must be eliminated by further trimming of the part thus realized.

Such a method therefore requires two heating-cooling cycles:
  a first one during compacting to make up the consolidated sheets;
  a second one during stamping In addition, the parts thus made must be trimmed to eliminate any low-cohesion edges.

Figure 2:
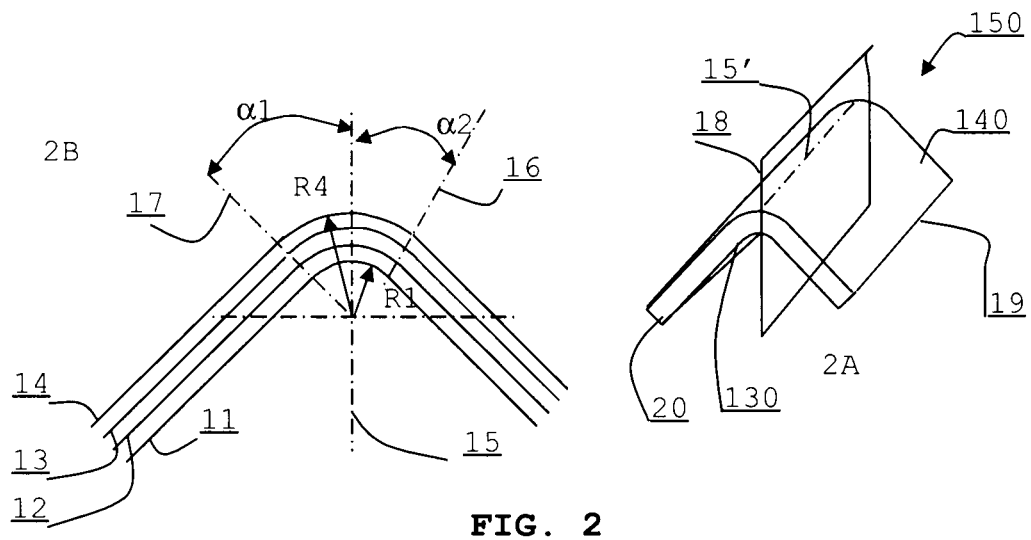
FIG. 2 is an end view of an example of a part according to the invention comprising a single fold.
Figure 3:
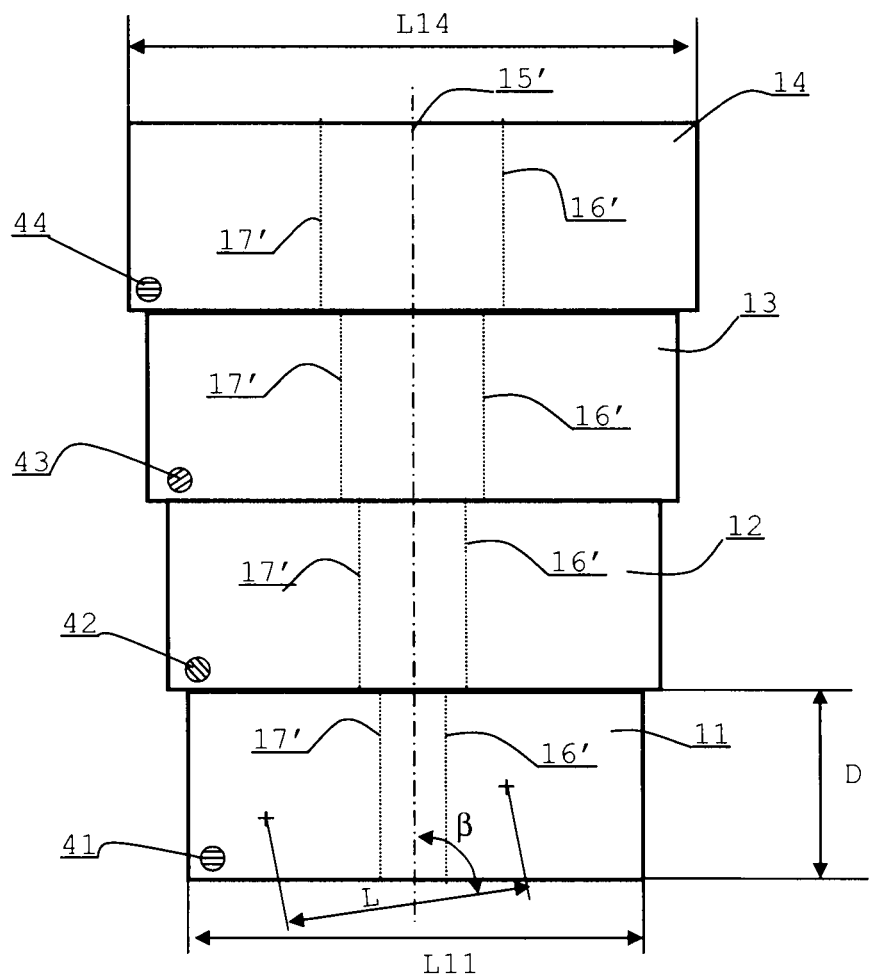
FIG. 3 is a top view of an example of plies making up the part of FIG. 2.

According to the invention, FIG. 2, the plies (11, 12, 13, 14) making up the part are cut to different sizes depending on their position in the depth, FIG. 3.

In this example, FIG. 2, forming is a simple folding along a bending radius that varies between a radius R1 on the inner surface (130) and a radius R4 on the outer surface (140). If δ is the thickness of a ply after consolidation, where the part (150) of the example contains 4 plies, the relationship between the two bending radii is given by:

$$4 = R1 + 4\delta.$$

For a part comprising an indefinite number of plies, the bending radius of the Nth ply, counted from the inner surface to the bending radius, bent along a radius R1 is given by the relation:

$$RN = R1 + N\delta.$$

Figure 4:
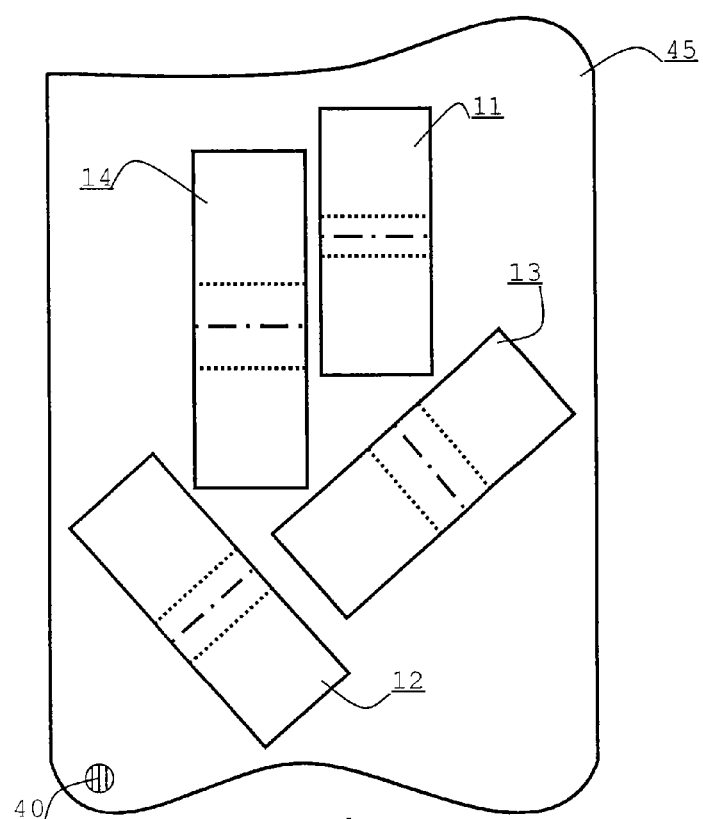
FIG. 4 is an example of arrangement of the plies in FIG. 3 as a set in a tape.

The fibers contained in each ply (11, 12, 13, 14) are arranged along a specific orientation (41, 42, 43, 44). The various plies making up the part (150) are cut from a pre-impregnated tape (45) comprising unidirectional fibers (40), FIG. 4. Said plies (11, 12, 13, 14) are cut in the tape according to their orientation and to the dimensions specified by their position in the depth of the part and the orientation of said dimensions relative to the folds.

The plies are superimposed in order to make up a preform; the assembly of plies is stabilized by a welded seam.

The plies (11, 12, 13, 14) can thus be positioned by superimposing them along the mark (15', 16', 17') on the surface of each ply of a plane (18) defined by a bending radius (15, 16, 17) and extending from one extremity of the part to the other, perpendicular to that axis. Any radial axis included in the angular sector (α1+α2) defining the bending radius is suitable for this purpose, but the best choice will depend on the positioning of the preform in the shaping tools.

For example, it is possible to choose to superimpose the plies along the median radial plane (18) of the bending radius, 5A. In this case, the plies are assembled by welding along the mark (15') on the various plies of this plane, and this line will be brought into line with the same line on the tools.

On consolidation, as a result of pre-compaction (P1) and compaction (P2) pressures, there will be no relative movement other than in the depth direction along this line.

Figure 5:
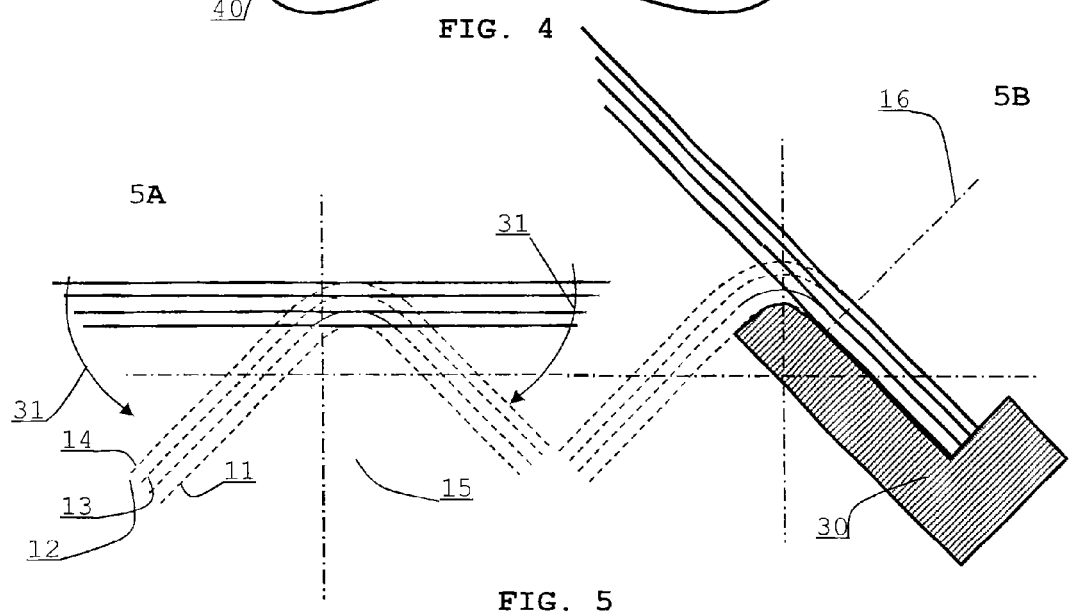
FIG. 5 is an end-view of an example of positioning the stack of plies in the consolidation toolset, FIG. 5A along a reference generatrix, FIG. 5B along a reference surface.
Figure 6:
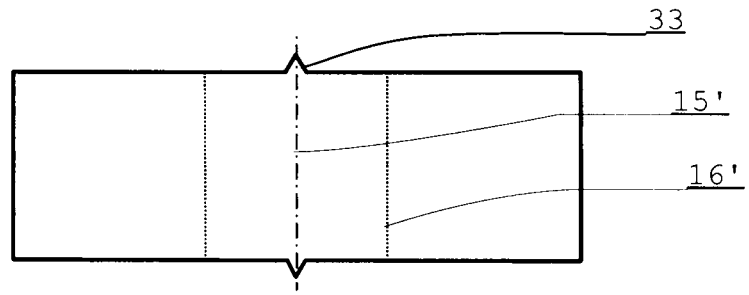
FIG. 6 is an example of a ply cut with a guide to facilitate its alignment on a forming generatrix.

This occurs as if the preform had been formed according to a forming modus operandi identical to that shown in FIG. 1, along the arrows (31) in FIG. 5A. This is why the lines (15', 16', 17') are referred to, by analogy, as "forming generatrices."

However, the preform has very little or no rigidity, even though the plies are locally secured by welding. So it is very difficult to position it along a line at the top of the tools.

To achieve this, the plies can be cut so as to include a guide pin (33) at each extremity of the forming generatrix. These guide pins make it easier to superimpose the plies and to position the preform thus assembled in the toolset, one notch being provided therein it to receive the guide pins, for example. Once the preform is installed in the toolset, the guide pins are cut, advantageously while the toolset is being closed.

Alternatively, it is advantageous to use an edge (19, 20) and a surface of the preform as reference surfaces, FIG. 5B.

In this case, this occurs as if the preform were folded along a forming generatrix (16') located at the tangency between the bending radius and the reference surface. In this case, the plies overlap and are welded along this forming generatrix (16'). This method of superposing the plies and positioning the preform means that a template (30) can be used for positioning the plies together, FIG. 5B, and that the preform can be more accurately positioned in the toolset.

The dimensions of the plies are defined by their position in the stack and by the direction of the dimension under consideration in relation to the fold. In this way, in the case of a part (150) with a simple fold, characterized by a forming generatrix (15', 16', 17'), the dimensions (D) measured parallel to the generatrix are not modified from one ply to another. A dimension (L1) measured perpendicular to the forming generatrix will change depending on the position of the ply in the depth of the part and on the bending radius R.

For example, if the bending angle is ($\alpha 1+\alpha 2$) and the thickness of a ply $\delta$, then the length L14 of a ply on the outside of the bending radius and measured perpendicular to the forming generatrix (16') will be greater than the length (L11) of a ply located inside the folding radius. In the example of a part (150) comprising 4 plies.

$$L14=L11+3(\alpha 1+\alpha 2)\cdot \delta$$

In the case of N plies:

$$LN=L11+(N-1)\cdot(\alpha 1+\alpha 2)\cdot \delta$$

The angles are expressed in radians.

If a dimension L is oriented at an angle $\beta$ to the forming generatrix, its total variation $\Delta$ depending on the depth in a part comprising N plies $\delta$ deep is expressed by:

$$\Delta=N\cdot(\alpha 1+\alpha 2)\cdot \delta \cdot \sin(\beta)$$

Figure 7:
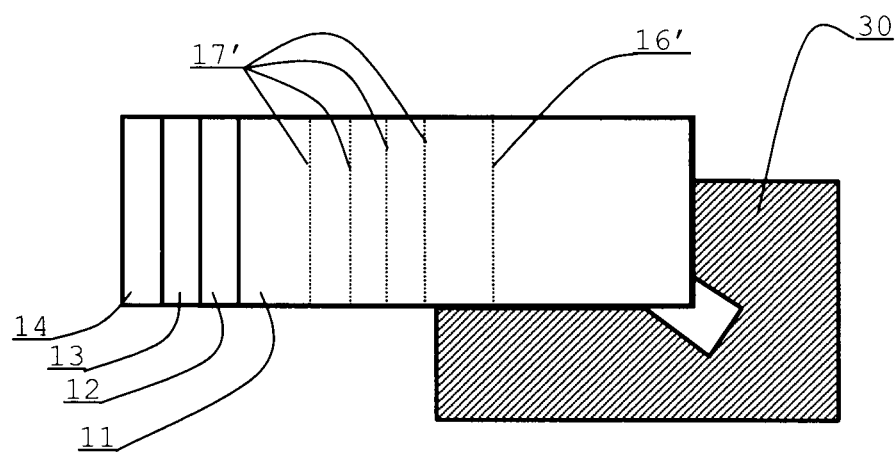
FIG. 7 shows the stacking and the alignment of the plies making up the part in FIG. 2 according to an alignment corresponding to FIG. 5B.
Figure 8:
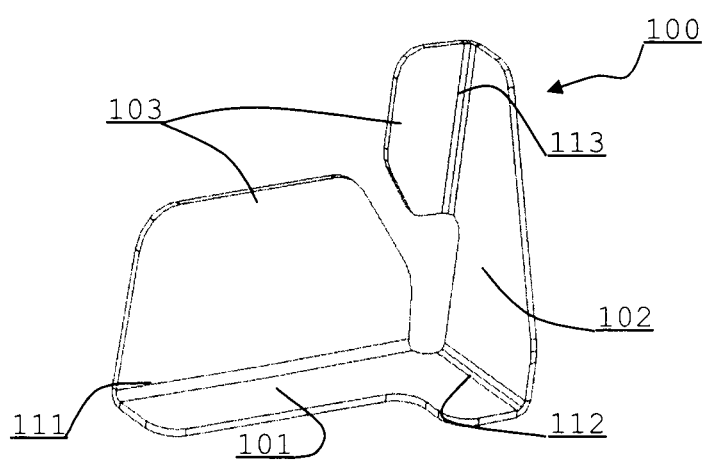
FIG. 8 is a perspective view of an example of a trihedral part which can be obtained with the method according to the invention.

In another example of realization, the method according to the invention can be used to manufacture trihedral structural parts (100), FIG. 8. Such parts have wings (101, 102, 103) contained in 3 intersecting planes. Advantageously such parts can be developed so that the way they are formed is similar to folding along several forming generatrices. The method according to the invention is also applicable to non-developable parts, e.g. parts such as that shown in FIG. 7, where at least one wing has a double curvature along radii parallel to the depth of the part, provided that the radius of curvature of at least two curvatures of said wing are greater than 1000 times the thickness.

In practice, the allowable radius of curvature depends on the part's contour tolerances and on the misalignment tolerance of the fibers.

Figure 9:
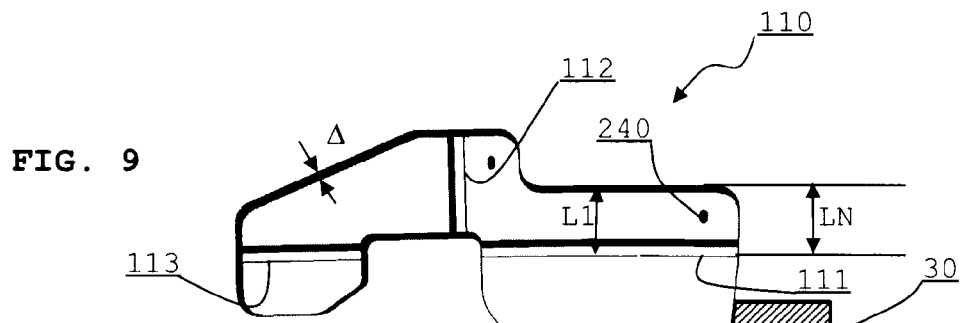
FIG. 9 is a top view of an example of the stack of plies pre-cut for manufacturing the part of FIG. 7 by the method according to the invention.

To make such a part (100), plies are cut to dimensions depending on the position of said folds in the depth of the part and on the fiber orientation, on the same principles as outlined above, FIG. 9. The plies in question are cut from the tape or fabric pre-impregnated with thermoplastic resin. Pre-impregnation may be carried out as a pre-bonded film on either side of said tape or said fabric, or by dusting.

Cutting the pre-preg is realized by any suitable means known to the expert, such as vibrating blade or laser, advantageously using a digital cutting machine.

The various plies overlap at the forming generatrices (111, 112, 113). The position of these generatrices is determined by the balancing of the part and its positioning on the tools.

Here the wing (103) with the largest area is chosen as a reference, and the part can be laid up along a template (30) referencing this area.

Starting at the forming generatrix (111), which corresponds to the fold between this reference area (103) and the adjacent perpendicular area (101), the dimensions measured perpendicular to the forming generatrix are defined for each ply based on its position in the depth of the part between the value L1 and the value LN. Since the bending angle is 90° here, and the total thickness of the part is 2.5 mm, the total variation in width of the plies (LN–L1) is:

$$2.5\cdot(\pi/2)=3.927 \text{ mm}$$

To calculate the change in width ($\Delta$) of the plies located at the edge, oriented at an angle $\beta$, to the wing (102) perpendicular to these first two wings, the effects of two folds at a 90° bending angle whose forming generatrices are also perpendicular must be combined, such that:

$$\Delta=\sqrt{(2.5\cdot \pi/2)^2 \cdot (\sin^2 \beta)+\sin^2(\pi/2-\beta)}=3.927 \text{ mm}$$

For cases with more complex folding combinations, the directions of the folds must be broken down along an orthonormal reference space and the contributions of each fold combined as above. These calculations are advantageously performed by computer-aided design and manufacturing software (CAD/CAM), which also helps to generate the contour of each ply depending on its orientation and to integrate it optimally in a cutting set.

The distance between the forming generatrix and the edge of a ply is then greater for a ply located outside this radius than inside.

The plies are superposed in a precise manner to make up the preform (110). This precise superposition can be performed manually, either by using a template (30) and/or with the help of an assistant device that projects the outlines of the successive plies on the layup table.

The superposed plies are locked against each other by means of welds realized along the forming generatrices.

The function of these welds is to immobilize the plies against each other until the removal of the preform (110) thus obtained in the toolset. The presence of these welds does not interfere with forming because the welded areas are returned to fusion in the consolidation phase.

Alternatively, the layup of the plies can be made directly in the tools on the punch (22) or in the die (21) which then serve as templates. Advantageously the ridge of the punch (262) can serve as a stop to position the plies.

Once the preform (110) is placed in the toolset, the trace of the forming generatrices (111, 112, 113) on the preform is substantially superimposed on the traces of these generatrices on the punch (111", 112", 113") and on the die (111', 112', 113').

Figure 10:
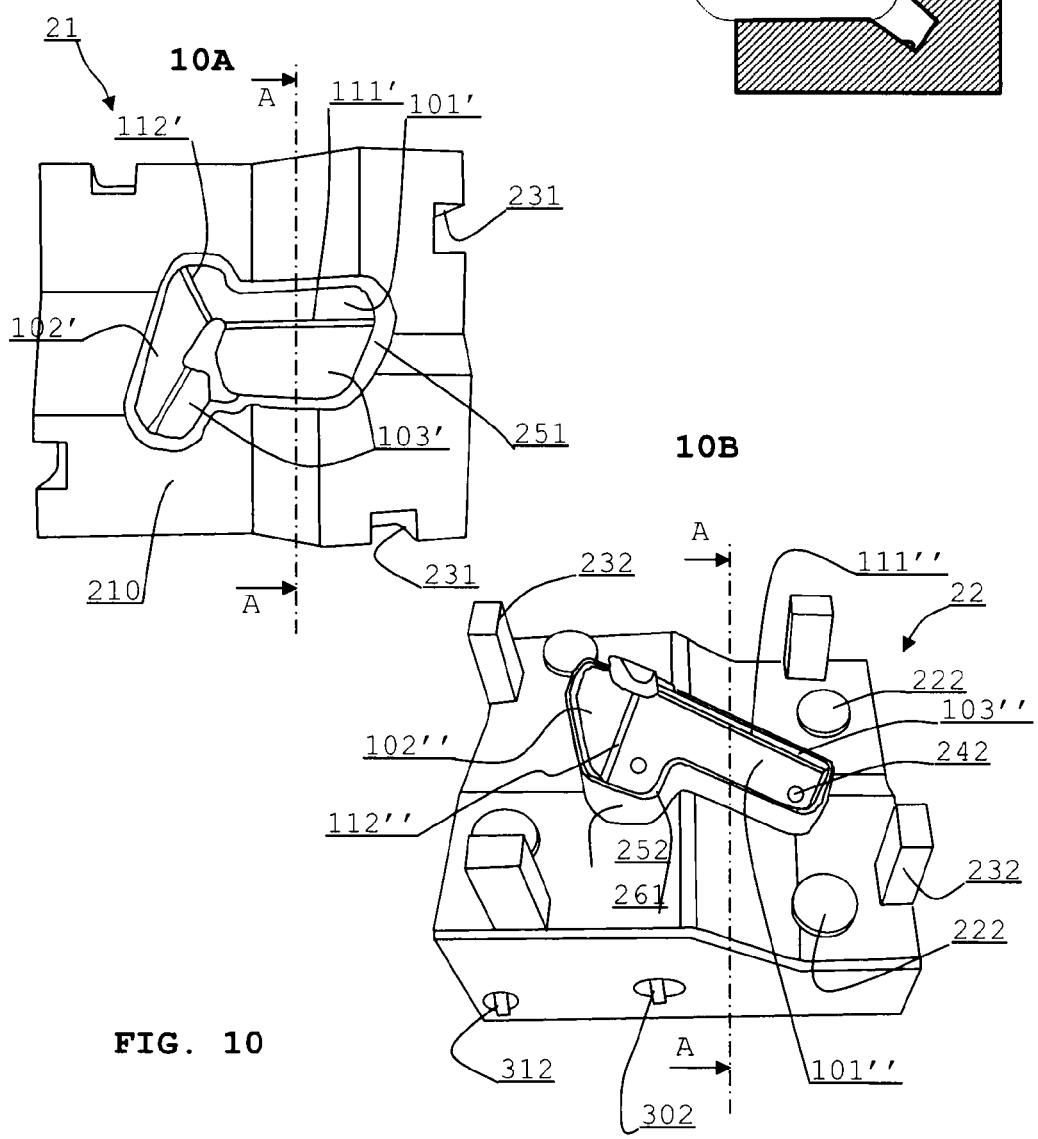
FIG. 10 is a perspective view of a device implementing the method according to the invention.

An example of a tool implementing the method according to the invention, FIG. 10, comprises a punch (22) and a die (21). These two sets comprise guiding devices (231, 232). As an example, such guide elements consist of a tenon (232) longer than the difference between the maximum thickness of the preform (110) and the final thickness of the part to be realized (100), machined or attached to the punch (22) or to the die (21), and a mortise with a complementary section (231), made on the element opposite. The tenon (232) and the mortise (231) are specifically adjusted to realize a perfect match of the two shapes. The punch and die are each mounted on the trays (51, 52) of a hot press (not shown). Advantageously, at least one of the two is mounted floating in relation to the reference of said press so that the relative closing movement of the punch (22) in relation to the matrix (21) does not hinder the relative guidance of one element in regards to the other.

The punch and die reproduce the surfaces of the part (101', 102', 103', 101", 102", 103"); the distance between the corresponding surfaces of the punch (101", 102", 103") and of the die (101', 102', 103') define a clearance when the punch is installed on the die. This clearance is at its minimum (e2) when the punch (22) and the die are in contact at their parting lines (210, 220).

The punch form's base protrudes in relation to the parting line (220) in the same way as the imprint of the die is hollow in relation to its parting line (210), so that the lateral contour surfaces of the punch (252) fit into the hollow lateral contour surfaces (251) of the die. To this end the lateral surfaces of the die are slightly undercut at an angle of about 0.5°, such that the perimeter of the lateral contour surfaces of the imprint measured in a section at the parting line is longer than the perimeter of the lateral contour surfaces measured in a section located at a certain distance from the parting line towards the inside of the die.

At the parting line, the lateral contour surfaces (251) of the die have approximately 0.2 mm of play with the lateral contour surfaces (252) of the punch. Because of the undercut to the die's imprint, this play is reduced to a value of 0.05 to 0.1 mm at the other extremity of the lateral contour surfaces.

To avoid any risk of jamming between the punch and die when closing or opening the press, the guide elements (231, 232) must be carefully realized and adjusted. For a part as shown in FIG. 7, which fits in a cube with 300 mm sides, the relative play between the guide elements (231, 232) is less than or equal to 0.02 mm.

Advantageously, the stamp comprises a ridge (262) protruding from the surfaces of the form. This ridge fits into a groove (261), realized on the perimeter of the die's form, when closing the mold.

Firstly, this ridge helps to position the preform accurately in the toolset, and secondly allows the part's volume to be fixed when the tool is closed to the minimum clearance value, thus avoiding any loss of resin and also allowing the formation of clean edges.

At the top of the ridge, a bead (23) is placed, which is made of a material capable of deforming without breaking under the impact of the closure of the press and able to withstand temperatures at or above the fusion temperature of the resin making up the part.

For example, the bead (23) may be made of aluminum or silicone. Crushing this bead (23) beyond a given relative position of the die and the punch seals the clearance between the punch form and the imprint of the die.

In this example of realization, the punch is mounted on the fixed tray of the press and the die on the moving tray. Before the method according to the invention is implemented, all surfaces of the imprint and form are coated with a suitable mold release agent to prevent adhesion of resin to the surfaces of the toolset.

Once the preform (110) is formed, it is placed on the punch (22), with the tools open. Advantageously, holes (240) can be precut into the plies making up the preform. These pre-cut holes fit over pins (242) realized on the punch. Said pins (242) are calibrated to the final diameter of the hole.

Figure 11:
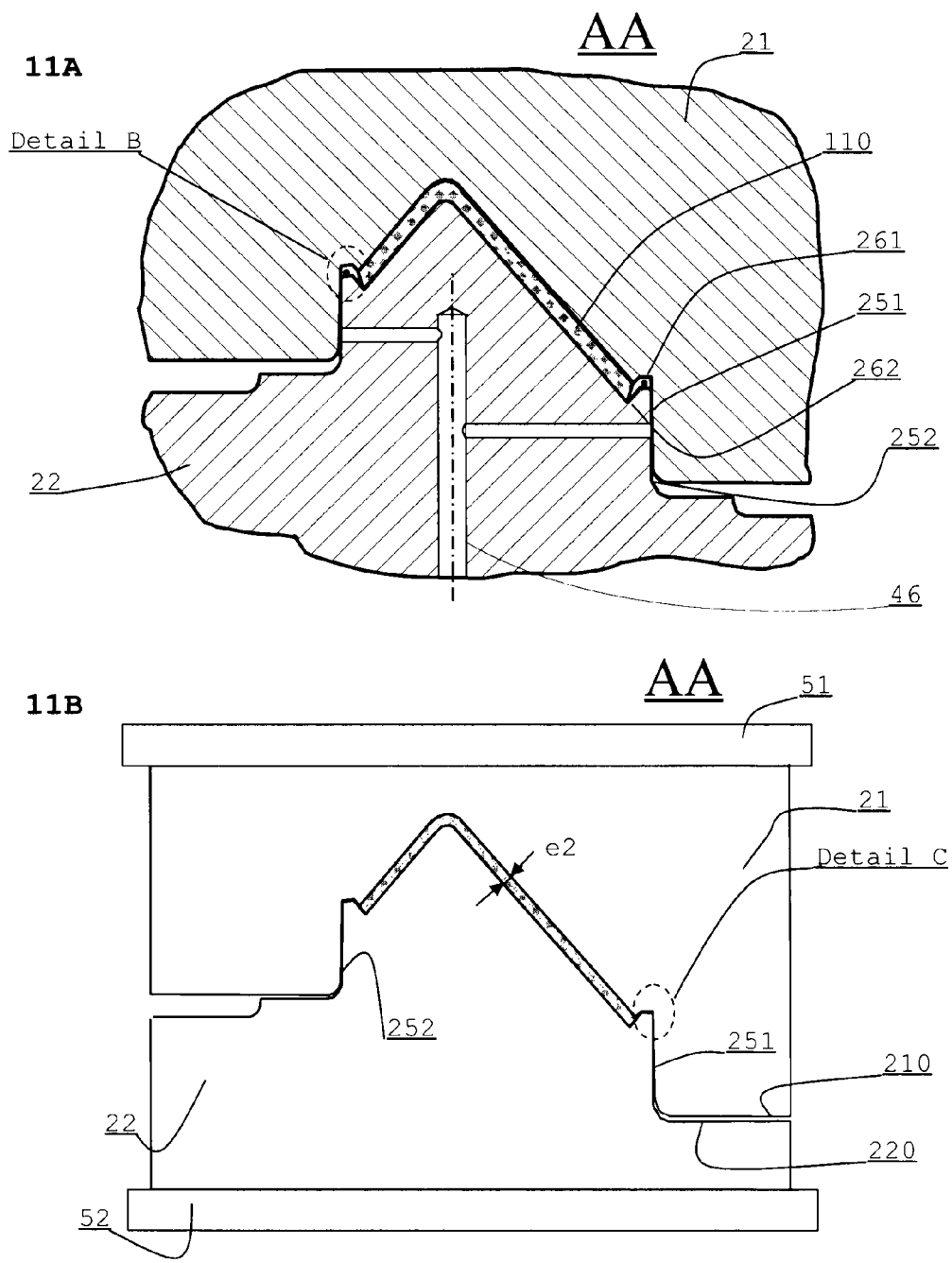
FIG. 11 is a summary of the implementation of the method according to the invention with the device of FIG. 10 along a section AA of this toolset.
Figure 12:
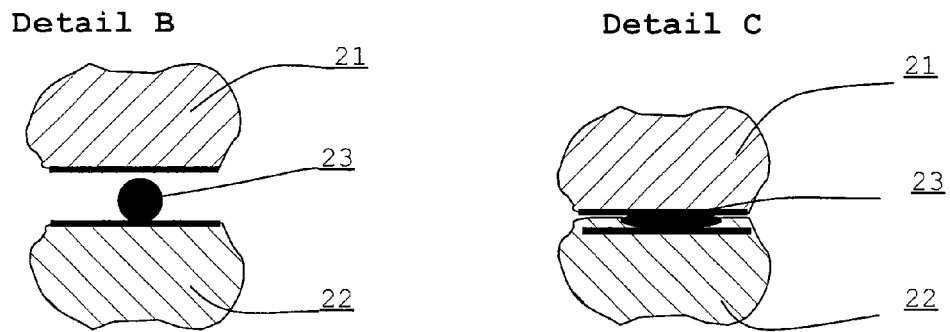
FIG. 12 is a detail view of the sealing device between the punch and the die.

The toolset is then closed by lowering the die on the punch, FIG. 11A. A suction device is connected to the punch or the die via a connector (302). This connector is connected to a suction system (46) that exits on the lateral contour surfaces of the punch or of the die.

The preform is placed on the stamp; the toolset is closed by means of the press. A pressure P1 of at least 2 daN/cm² is applied to the preform. To this end, the compression force generated by the press is set to a value such that this force divided by the projected area of the imprint in a plane normal to the direction of this force is at least 2 daN/cm².

Despite applying this pressure, the bead (23) is not crushed because of the thickness of the preform and therefore the chamber formed by the clearance between the punch form and the imprint of the die containing the preform is not hermetic. In these conditions, the suction device can suck the gases in this chamber thanks to the play remaining between the lateral contour surfaces (251, 252).

Figure 13:
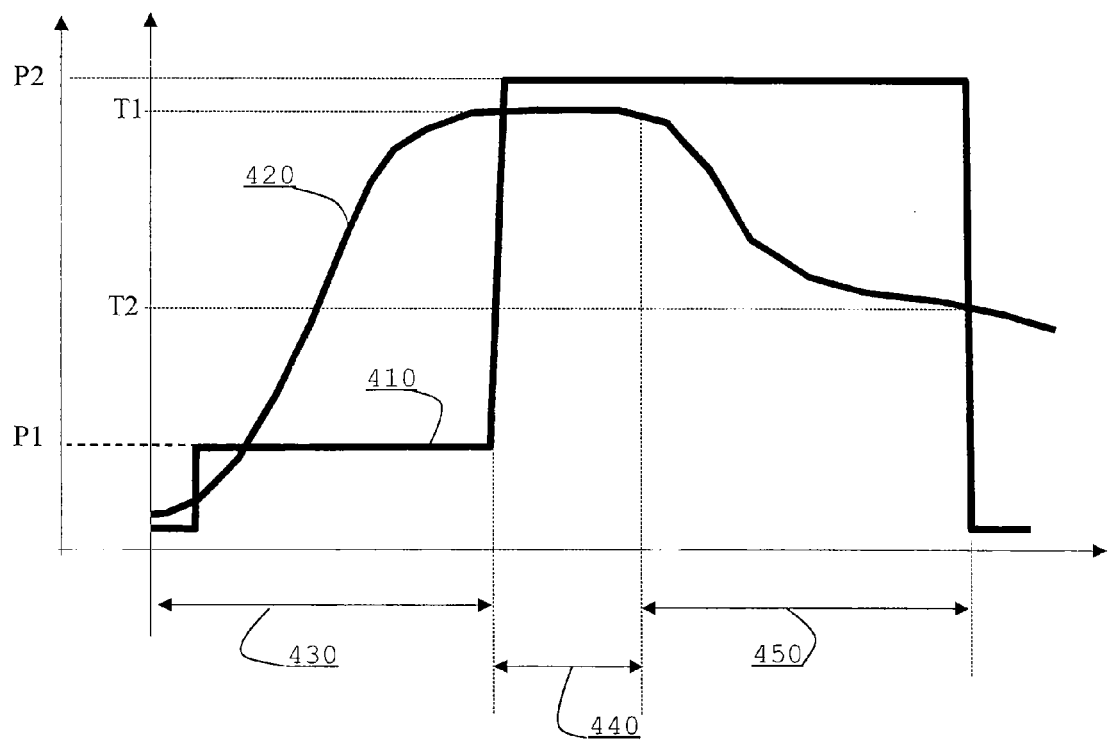
FIG. 13 is a time-temperature-pressure diagram showing an example cycle applied during the method according to the invention.

The consolidation cycle, FIG. 13, consists of 3 phases (430, 440, 450) corresponding to times when pressure (410) and temperature (420) are applied. The heating/cooling cycle (420) is launched from the closure of the toolset, and consists of heating to a temperature T1, which is equal to or greater than the resin's fusion temperature. During this first phase of the cycle, a contact pressure P1 of at least 2 daN/cm² is applied to the preform.

When the temperature approaches the resin's fusion temperature, the resin becomes fluid and the expansion can be broken. Applying pressure P1 compresses the preform and when the clearance reaches a value (e1) corresponding to the theoretical thickness of the part plus the theoretical value of the expansion, the die's groove (261) comes into contact with the bead (23) which has the effect of sealing the chamber in which the preform is located. Said chamber being sealed, there is no risk that the suction device will suck in resin. Aspiration can be stopped.

When the temperature reaches the resin's fusion temperature, the pressure is increased to a value P2 limited to the projected area of the imprint, which is equal to or greater than 10 daN/cm². The relative movement of the die compacts the preform and crushes the bead (23). Since the chamber is sealed, the amount of resin therein remains constant.

The temperature is maintained at this pressure for a time (440) sufficient to ensure optimal compaction of the preform and uniform distribution of the resin therein. The mold is then cooled to a temperature lower than or equal to the resin's glass transition temperature (T2), at which temperature the part has sufficient rigidity to be demolded without difficulty. Advantageously, the cooling can be accelerated by circulating a heat transfer fluid (water, oil, etc.) in the toolset. The compacting pressure P2 is maintained during the cooling phase. This pressure corresponds to a final clearance (e2), determined according to the theoretical thickness of the part.

The final theoretical thickness of the part corresponds to the theoretical thickness of a ply, δ, multiplied by the number of plies making up the preform.

The expansion can be determined experimentally and depends on the nature of the plies making up the preform and the impregnation method of the plies. For example, the expansion is 34% for carbon fiber tapes powdered with polyether ether ketone (PEEK) resin and 50% for fabric pre-bonded with polyphenylene sulfone (PPS) film. Therefore, in the case of a part made of plies in the form of pre-impregnated fabric with a pre-bonded PPS film, the first clearance (e1) is 1.5 times larger than the final clearance (e2).

The height of the bead (23) will be selected as being at least equal to the difference between the clearance plus the expansion and the theoretical clearance (e1−e2).

Heating the die and the punch can be realized by any means known to experts, e.g. by circulating hot oil, by the heated trays of the stamping press (51, 52) or by induction, to bring the preform approximately up to the resin's fusion temperature. The extraction of the gases is maintained throughout the heating phase (430).

The minimum value of the clearance (e2) corresponds to the theoretical thickness of the final part, adjusted for the differential thermal expansion between the material of the preform and the material of the toolset.

This adjustment is performed by a homothety coefficient determined experimentally and applied to the general shape of the tools in the 3 directions of the space. This adjustment is performed, for example, using the CAD/CAM computer tools used to design and manufacture said tools. This factor is for example equal to 0.9985 for a PPS matrix composite reinforced by carbon fibers formed in a toolset made of steel containing 0.4% carbon, 2% chromium, manganese and molybdenum as alloy elements (AFNOR 40CMD8-DIN 40CrMnMo7). Thus, all the theoretical dimensions of the toolset are multiplied by this coefficient along all 3 axes to allow for differential expansion between the material of the preform and the material of the toolset. In this example the tool has a coefficient of expansion greater than that of the preform, and therefore has a volume at ambient temperature about 0.45% lower than the resin's fusion temperature.

The shapes of the punch and of the die are also adjusted to allow for the angular withdrawing of the part's surfaces during cooling. This angular correction is applied to each radius whose angular sector (α1+α2) is greater than 70°, in particular at the bending radii corresponding to the forming generatrices. This angular correction is determined experimentally; it is for example 2.75° for a PPS-carbon fiber composite. So for an angular sector of 90° on the finished part, this sector will be realized at an angle of 92.75° on the toolset.

Advantageously, spacers (222), FIG. 9B, attached to the parting line of the punch (220) and/or of the matrix (210) are adjusted so as to accurately define the distance between the two elements, and therefore the clearance (e2) while closing, i.e. when the punch is resting on the die. In the prior state of the art, the punch-die tool is generally sealed at the parting line. In this example of realization of the tools, the seal is realized on the lateral contour surfaces of the punch (252), of the die (251) and the bead (23). It is thus possible to adjust in a very precise and simple way the value of the clearance (e2) in the imprint when closing the tool, for example by adjusting the spacers (222), regardless of the hermeticity constraint.

The toolset is opened by separating the punch from the die using the press after which the part is demolded.

Realized in this way, the part is finished and requires no further trimming.

Advantageously, holes can be realized during the consolidation phase. To this end, retractable needles are placed in the punch, e.g. at the location of the pins (242). In the retracted position, said needles are flush with the surface of the form (101″). In this case the preform does not comprise any cut corresponding to the holes (240). During the consolidation phase, when the resin is at the fusion temperature, the needles, coated with a release agent or covered so as to avoid any resin bonding to their surface, are extended using an operating device (312) and penetrate the preform by separating the fibers until they come into contact with the opposite die surface. The needles remain in the extended position throughout the consolidation phase and the subsequent cooling phase. Thus, when demolded, the parts will have holes at the locations of the needles. For small diameter holes, between 1 mm and 4 mm, such holes can thus be achieved without cutting any fibers, and with an acceptable disorientation of the fibers on the edges of the hole. For larger diameter holes, it is possible to combine a pre-cut hole in the plies and piercing with a needle during consolidation. The needles' retraction/extension device may be mechanical in nature, e.g. by eccentric, or pneumatic.

The combination of the method and the device for implementing it according to the invention achieves a part thickness accurate to +/−0.05 mm of the nominal thickness, a contour accurate to +/−0.1 mm of the nominal contour, directly after the consolidation with no subsequent rework of the part being machined.

Compared to the stamping process of continuous fiber thermoplastic composites according to the prior state of the art, the method and the device implementing it can reduce the cycle time for producing a finished part by around 35% while reducing the wastage rate by half.

The invention claimed is:

1. A method for manufacturing a structural part including at least two wings extending in intersecting planes, the part being made of a thermoplastic fiber-reinforced composite material including a stack of at least two plies of continuous fibers, the fibers extending from one wing to another, the method comprising:
cutting the at least two plies in a fabric and/or a tape of fibers pre-impregnated with a thermoplastic resin;
assembling the plies to create a preform;
compacting the preform to a final shape of the part by subjecting the preform to a defined cycle of temperature and pressure;
wherein:
in the cutting, each ply is cut along in a contour determined by fiber orientation and a position of the ply in the stack and a position of forming generatrices, so to compensate for interlaminar offsets at edges of the plies resulting from bending the preform, each forming generatrix corresponding to a fold line of a flat preform to obtain the part;
in the assembling, the superposed plies are locked against each other by welds realized along the at least one forming generatrix of the preform;
the compacting is carried out in a toolset comprising a rigid punch and die that define a sealed chamber between the punch and the die, whose clearance between their respective surfaces defines the shape of the part.

2. A method according to claim 1, wherein, in the cutting, the plies are cut to reveal a guide pin at each extremity of the at least one forming generatrix, the guide pins making it easier to superimpose the plies and to position the preform thus assembled in the toolset; wherein the guide pins are cut during closing of the tool, once the preform is installed in the toolset.

3. A method according to claim 1, wherein the compacting comprises applying a cycle of pressure/temperature to the preform, which comprises:
a temperature rise under a first pressure P1, applied to the preform up to a temperature equal to or greater than the resin's fusion temperature;
remaining at this temperature under a pressure P2, which is higher than P1;
cooling to a temperature, lower than the resin's glass transition temperature under pressure P2;
pressure release.

4. A method according to claim 3, wherein, during the first rise in temperature under a pressure P1, the clearance between the punch and the die is set to a first thickness and, while this temperature is maintained under a pressure P2, the clearance between the punch and the die is set to a second thickness such that the first clearance value is greater than the second clearance value; the clearance values are selected so that the second thickness corresponds to the final theoretical thickness value of the part, adjusted for the differential thermal expansion between the material of the preform and the material of the toolset and the first thickness corresponds to that same thickness increased by the expansion of the preform.

5. A method according to claim 3, further comprising a suctioning of gases contained in the sealed chamber during the temperature rise.

6. A method according to claim 3, wherein the pressure P1 is at least equal to 2 daN/cm$^2$ and the pressure P2 is equal to or greater than 10 daN/cm$^2$.

7. A method according to claim 1, further comprising piercing the preform during the compacting.

8. A method according to claim 7, wherein the piercing is realized by retractable needles, which are extended during the compacting, when the resin is at its fusion temperature, penetrating the preform by separating the fibers to come into contact with the opposite surface of the die; wherein the needles remain in the extended position throughout a subsequent compacting.

* * * * *

UNITED STATES PATENT AND TRADEMARK OFFICE
CERTIFICATE OF CORRECTION

| | | |
|---|---|---|
| PATENT NO. | : 8,721,830 B2 | Page 1 of 1 |
| APPLICATION NO. | : 13/203350 | |
| DATED | : May 13, 2014 | |
| INVENTOR(S) | : Didier Kurtz et al. | |

It is certified that error appears in the above-identified patent and that said Letters Patent is hereby corrected as shown below:

On the title page, item (54) and in the specification, column 1, line 1, title should read:

--METHOD FOR COMPACTING TO ITS FINISHED DIMENSIONS A THERMOPLASTIC COMPOSITE PART WITH CONTINUOUS FIBRES--

Signed and Sealed this
Fifth Day of August, 2014

Michelle K. Lee
*Deputy Director of the United States Patent and Trademark Office*